UNITED STATES PATENT OFFICE.

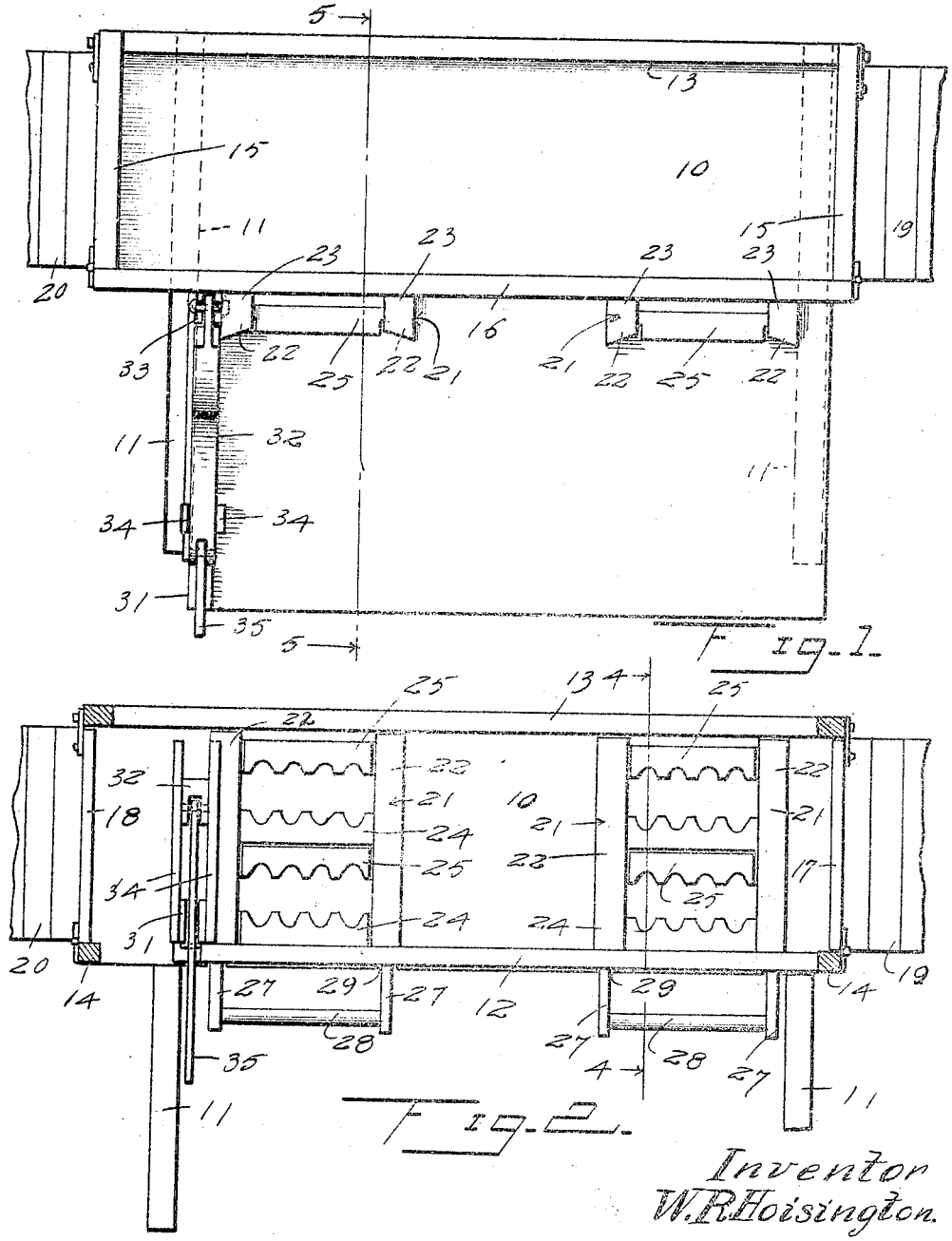

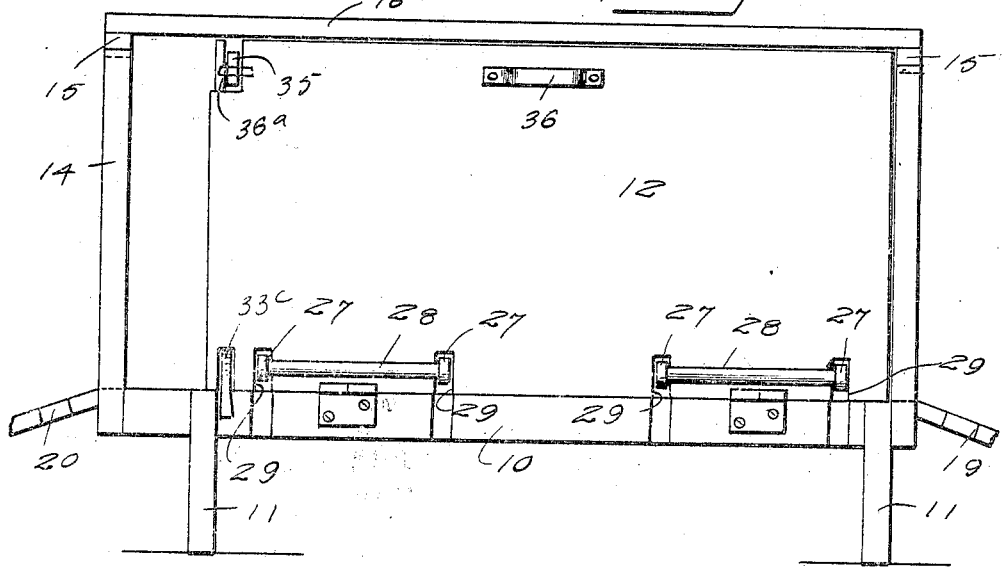
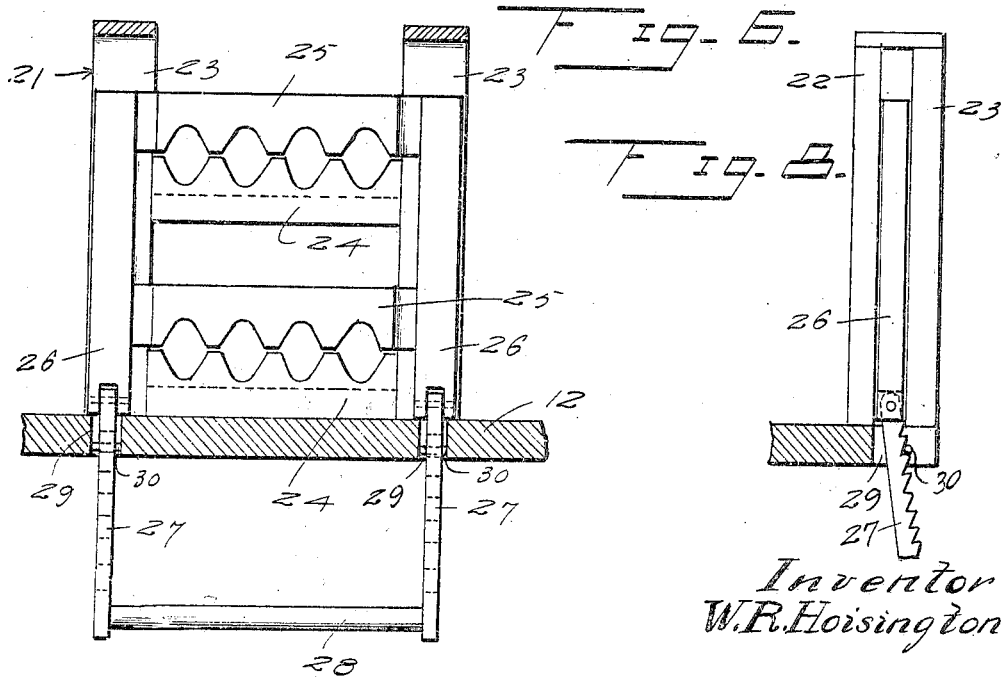

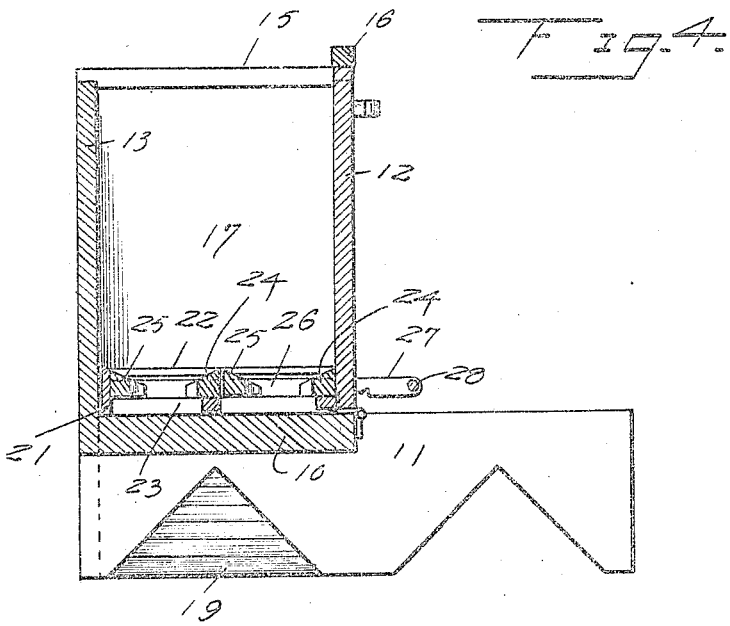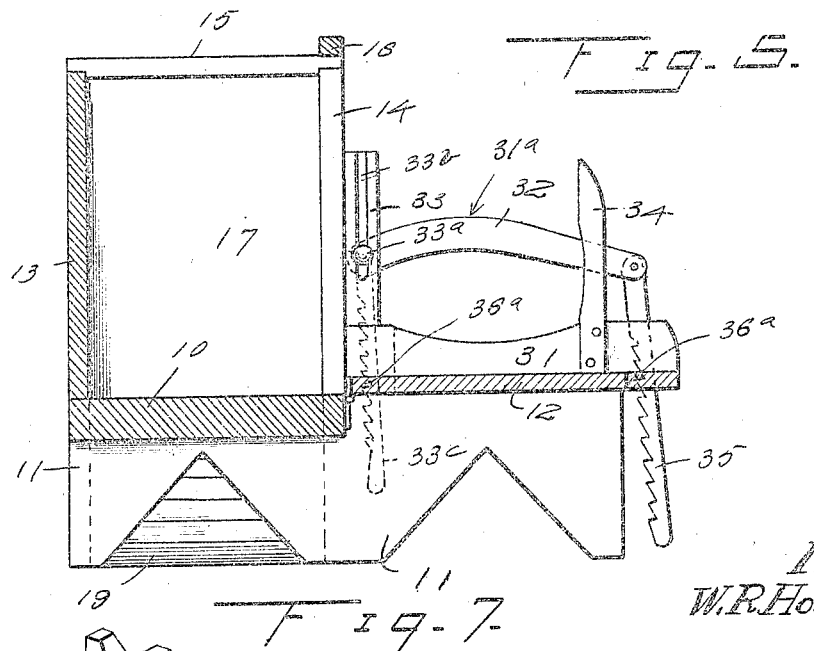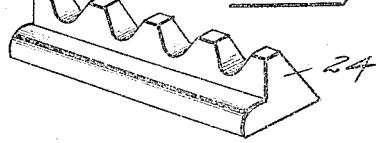

WILLIAM R. HOISINGTON, OF WALTHILL, NEBRASKA.

HOG CATCHING AND HOLDING DEVICE.

1,377,833.  Specification of Letters Patent.  Patented May 10, 1921.

Application filed April 3, 1920. Serial No. 371,001.

*To all whom it may concern:*

Be it known that I, WILLIAM R. HOISINGTON, a citizen of the United States, residing at Walthill, in the county of Thurston and State of Nebraska, have invented certain new and useful Improvements in Hog Catching and Holding Devices; and I do hereby declare the following to be a full, clear, and exact description of the invention, such as will enable others skilled in the art to which it appertains to make and use the same.

This invention relates to an improved device for catching a hog or other animal and holding the same while being operated on.

Another object of this invention is to so construct the device that the hog may be driven into a pen having the holding structure connected with one wall thereof and the feet of the hog then locked in the holding structure and the movable wall then swung downwardly to a lowered position to provide a table on which the hog will rest while the operation is conducted.

Another object of this invention is to so construct the feet holding elements that hogs of various sizes may be accommodated without it being necessary to make variations in the dimensions of the device, therefore, it can be seen that the device may be used for holding either young or grown animals.

A further object of this invention is to so construct the device that the feet and legs of the animal will not be injured.

A further object of this invention is to provide an improved type of actuating handles for the leg holding devices and to so construct the handles that when the leg holding devices have been moved into locking position, the handles may be released and locked against return movement thereby preventing the animal from releasing itself by struggling.

A further object of this invention is to so construct the device that the head or neck of the animal may be gripped or held preventing it from rising off of the operating table when swung into operative position.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a top plan view with the movable wall in a lowered or horizontal position, Fig. 2 is a similar view illustrating the movable wall in a raised or vertical portion, Fig. 3 is a view showing the improved device in side elevation and looking at the movable wall, Fig. 4 is a transverse sectional view taken on the line 4—4 of Fig. 2, Fig. 5 is a transverse sectional view taken on the line 5—5 of Fig. 1.

Fig. 6 is a sectional view illustrating one of the feet gripping structures,

Fig. 7 is a perspective view of one of the feet gripping devices,

Fig. 8 is an end view partly in section illustrating a means for holding the handles in locking position.

This device is in the form of an elongated pen or house having a flooring 10 which is supported by cross beams 11 extending beyond the pen or housing so as to provide supports for a movable wall 12 which is hinged to one side edge of the flooring 10. A second wall 13 is stationary and extends on the opposite side of the flooring from the movable wall 12. Standards 14 are positioned at opposite ends and at one side of the flooring and are connected with the wall 13 by braces 15 and are connected with each other by a longitudinally extending brace 16 that is positioned above the movable wall when in a vertical or elevated position. Doors 17 and 18 are provided so that after an animal has entered the pen, the doors may be closed to prevent the escape of said animal. In order to permit the animal to easily enter and leave the pen, gangways 19 and 20 are provided which lead to the flooring 10 from the ground.

In order to hold the animal, there have been provided feet engaging elements each of which is provided with side bars 21 and has rails 22 and 23 which are disposed in spaced relation to each other and extend from the movable side wall toward the stationary wall when said movable wall is in vertical or elevated position. The stationary jaws 24 extend between the side bars 21 and are firmly held in place and the movable jaws 25 are slidably mounted and have their ends connected with links or rods 26 which are slidably mounted between the rails 22 and 23. The links are pivotally connected with the side arms 27 of handles 28 and said arms extend through slots 29 formed in the movable wall, thus it will be readily seen that the movable jaw can be moved into a spread position without being necessary to enter the pen. The side arms are cut to provide teeth adapted to engage latches 30 carried by the movable wall and extend across slots 29 and after the handles have been swung upwardly to bring the teeth out of engagement with the latches, said handles may be drawn outwardly to move the jaws into locking position and then dropped to bring the teeth into engagement with the latches and securely but releasably hold the movable jaws in gripping or holding position.

The contacting faces of the movable and stationary jaws are cut to provide a plurality of recesses which register when the movable jaws are moved into clamping or holding position. The legs of the animals can therefore be engaged without danger of injury to said animals. It will be further noted that since the jaws are cut to provide a plurality of recesses, animals of different sizes may be caught and held and further that it is not necessary for an animal to stand in a certain place before the jaws may be brought into engagement with the legs thereof.

It is also desirable to hold the animal or hog other than by the legs and a neck holding device is provided which consists of neck engaging jaws 31 and 32 and the jaw 31 is secured to the movable wall 12 and has its end slotted to receive locking bars 33 and 35 that are pivoted to the ends of the jaw 32. The jaw 32 is mounted between guides 33 and 34 and one of the guides 33 has a slot 33$^b$ to receive the pivot bolts that connect the locking bar 33$^c$ to said jaw 32 which permits vertical adjustment of the jaw 32 but will prevent said jaw from moving laterally. The locking bars 33$^c$ and 35 are provided with teeth to engage pins 36$^a$ for adjustably securing the jaw 32 in relation to the jaw 31, whereby the neck of the animal may be firmly held.

When in use, the device is set up at a suitable point and the animal upon which it is desired to operate is driven into the pen and on the animal's feet entering between the stationary and movable jaws 24 and 25 of the leg holding devices, the handles 28 are drawn outwardly to cause the jaws to tightly grip the same and the handles are then dropped into engagement with the latches 30 to prevent separation of the jaws. The jaw 32 is then moved to grip the neck of the animal and locked and it will thus be seen that the animal is securely held and cannot struggle loose. The movable wall is then swung downwardly by the handle 36 and rests on the extended portions of the supporting beams 11 and constitutes an operating table. The animal is then resting on its side and any desired operation then may be easily conducted and also branding and placing of a ring in the nose may be readily accomplished. After the operation on the animal the movable wall 12 is again swung vertically to position the animal on its feet within the pen, when the neck and leg jaws are released so that said animal may pass out of the pen.

It will thus be seen that there has been provided a pen into which an animal may be driven and held in engagement with a movable wall constituting an operating table when swung downwardly or horizontally, and further, that the feet and head engaging elements may be operated from the exterior of the device.

While I have shown and described the preferred embodiment of my invention, it will be understood that minor changes in construction, combination and arrangement of parts may be made, without departing from the spirit and scope of the invention as claimed.

Having thus described my invention, what is claimed is:

1. An animal catching and holding device comprising a pen including a wall movably mounted for swinging movement from a vertical to a horizontal position, feet engaging elements connected with the movable wall and each having relatively stationary jaws, relatively movable jaws, the movable jaws and stationary jaws having their adjacent faces cut to provide foot receiving sockets and means for moving the movable jaws into and out of operative relation to the stationary jaws and releasably holding the movable jaws in an operative position.

2. An animal catching and holding device comprising a pen including a movably mounted wall, feet engaging and holding elements connected with the movable wall, each including side bars extending from the movable wall, stationary jaws rigidly secured between the side bars, movable jaws extending between the side bars, strips connecting the movable jaws and slidably carried by the side bars, and an actuating handle having side arms extending through slots formed in the movable wall and connected with the said strips.

3. An animal catching and holding device comprising a pen including a movably mounted wall, feet engaging elements carried by the wall and each including side bars extending from the wall across the bottom of the pen when the movable wall is in the raised position, a stationary jaw positioned between the side bars adjacent the wall, a stationary jaw positioned between the side bars intermediate the length of the side bars, strips slidably carried by the side bars, movable jaws positioned between the side bars and connected with the strips, a handle having side arms extending through openings formed in the movable wall and pivotally connected with the side strips for imparting movement to the same and moving the movable jaws into and out of operative relation to the stationary jaws, and means carried by the movable wall for engaging the side arms of said handle to releasably lock the handle against movement with the movable jaws in an operative position.

4. An animal catching and holding device comprising a pen including a movably mounted wall constituting an operating table when swung downwardly, foot engaging elements connected with the movable wall and each including side bars extending from the wall, stationary jaws rigidly secured between the side bars, movable jaws slidably mounted between the side bars, the coöperating faces of the movable and stationary jaws being cut to provide a plurality of foot receiving sockets, and actuating means for the movable jaws extending through the movable wall for operation externally of the pen when the wall is in a raised position.

5. An animal catching and holding device comprising a pen including a movably mounted wall, foot engaging elements carried by the wall and each including stationary jaws and movable jaws, and operating means for the movable jaws extending through the movable wall for operation externally of the pen when the movable wall is in a raised position.

6. The structure of claim 5 having the operating means provided with side arms cut to provide rack teeth, and means carried by the movable wall for engagement by the rack teeth to releasably lock the actuating means in a set position.

7. An animal catching and holding device including a pen having a movably mounted side wall, foot engaging means carried by the side wall, and head engaging means having a base bar extending transversely of the movable wall adjacent one end thereof, standards extending from the base bar adjacent the ends thereof, a head engaging yoke pivotally and slidably connected with one of the standards and extending between the standards of the opposite side of the movable wall, and a latching element connected with the free end portion of the yoke.

8. An animal catching and holding device comprising a pen including a movably mounted wall, foot engaging means carried by the wall, and a head engaging element comprising a base bar extending transversely of the movable wall, a standard extending from one end of the base bar and longitudinally slotted, a hinged bar extending through the movable wall and slidably connected to the slotted standards, a pair of standards adjacent the opposite end of the base bar, a yoke pivotally connected with the hinged bar and having its free end portion extended between the pair of standards at the opposite end of the base bar, and a latching bar connected with the inner end portion of the yoke and extending through the movable wall, and means for engaging the latching bar to releasably hold the same in the set position.

In testimony whereof I affix my signature in presence of two witnesses.

WILLIAM R. HOISINGTON.

Witnesses:
A. P. COLEMAN,
C. A. DARNELL.